United States Patent Office
3,803,105
Patented Apr. 9, 1974

3,803,105
POLYMERIZATION CATALYSTS
Paolo Galli, Ermanno Susa, and Giovanni Di Drusco, Ferrara, Italy, assignors to Montecatini Edison S.p.A., Milan, Italy
No Drawing. Continuation of abandoned application Ser. No. 1,859, Jan. 9, 1970. This application Feb. 14, 1972, Ser. No. 226,201
Claims priority, application Italy, Jan. 10, 1969, 11,360/69
Int. Cl. C08f 1/56, 3/06; B01j 11/84
U.S. Cl. 260—80.78   7 Claims

ABSTRACT OF THE DISCLOSURE

New polymerization catalysts are disclosed. The catalysts, which are particularly useful for the polymerization of ethylene and mixtures thereof with higher alpha-olefins and/or diolefins, are prepared by activating with a hydride or an organometallic compound of a metal belonging to Groups I to III inclusive of the Mendelyeev Periodic Table, the product obtained by reacting a hydrated magnesium halide having the formula $$MgX_2 \cdot nH_2O$$

wherein X is halogen and n is a number greater than zero, with a halogenated titanium or vanadium compound under conditions such that the hydrated magnesium halide is converted, at least on the surface thereof, to anhydrous magnesium halide.

---

This is a continuation of application Ser. No. 1,859, filed Jan. 9, 1970, now abandoned.

THE PRIOR ART

Dutch patent application No. 6714024 described catalysts for the polymerization of olefins consisting of the reaction product of an organometallic compound of a metal belonging to Groups I to III with the product obtained by reacting a transition metal halide with a carrier consisting of an anhydrous, oxygenated magnesium compound.

According to the Dutch patent, it is essential to use the carrier in completely anhydrous condition, in order to obtain satisfactory catalysts.

British Pat. No. 904,510 describes polymerization catalysts of the so-called "Ziegler type" and using, as one catalyst-forming component, an inorganic halide of the anhydrous $MgCl_2$ type covered by a very thin layer of a transition metal compound used in a quantity not greater than 1.0% by weight with respect to the inorganic halide. According to the British patent, also, it is necessary to use the carrier in completely anhydrous condition, in order to obtain a satisfactory catalyst.

THE PRESENT INVENTION

Surprisingly, in view of the prior art, we have found that catalysts for the polymerization of olefins, and having valuable properties, particularly a very high catalytic activity, can be obtained by reacting a hydrated magnesium halide of the formula $$MgX_2 \cdot nH_2O$$

in which X represents halogen and n is a number greater than zero, with a halogenated titanium or vanadium compound under conditions such that the hydrated magnesium halide is transformed, at least on the surface thereof, into anhydrous magnsium halide, and then mixing the reaction product thus obtained with a hydride or organometallic compound of a metal belonging to Groups I to III, inclusive, of the Mendelyeev Periodic Table.

Preferably, the hydrated magnesium halide is selected from the hydrated magnesium chlorides or bromides containing from 1 to 6 moles of water and, more particularly, from 1 to 4 moles of water. Examples of these halides include: $MgCl_2 \cdot 6H_2O$; $MgCl_2 \cdot 2H_2O$; $MgCl_2 \cdot 1H_2O$;

$$MgBr_2 \cdot 6H_2O$$

and $MgBr_2 \cdot H_2O$.

The titanium or vanadium compounds used in preparing the present catalysts include the normally liquid halogenated titanium or vanadium compounds, and also the normally solid halogenated titanium and vanadium compounds which are soluble in inert solvents which do not dissolve the magnesium halides. Representative examples of the useful titanium and vanadium compounds are: the tetrahalides, such as $TiCl_4$, $TiBr_4$, $VCl_4$, $VBr_4$ and $TiI_4$; the halo-alcoholates such as, for instance, $$Ti(O\text{-}i\text{-}C_3H_7)_3Cl,$$

$Ti(O\text{-}i\text{-}C_3H_7)_2Cl_2$, $Ti(O\text{-}n\text{-}C_4H_9)_2Cl_2$, and $$VO(O\text{-}i\text{-}C_3H_7)_2Cl$$

According to the preferred method, the preparation of the catalytic component comprising the titanium or vanadium compound is carried out by reacting the hydrated magnesium halide in an excess of a liquid halogenated Ti or V compound preheated to the boiling temperature and in general to a temperature greater than 100° C., and then removing the excess of the Ti or V compound.

Another method consists of dissolving the Ti or V compound in an inert solvent which does not dissolve the hydrated magnesium halides and/or the anhydrous halides formed during the reaction with the transition metal compound, and then reacting the hydrated magnesium halide with the solution so obtained, preheated at a temperature greater than 70–80° C., and preferably above 100° C.

In this case it is convenient to use the Ti or V compound in an amount sufficient to react with the water contained in the hydrated magnesium halide.

The amount of the titanium or vanadium compound which remains on the support obtained by reacting the halogenated Ti or V compound and the hydrated magnesium halide can vary from very low values such as for instance 0.01% by weight to higher values such as 20% or higher, depending on the reaction conditions and on the percentage of water present in the hydrated magnesium halide.

Preferably the conditions are such that the amount of Ti or V compound present on the support is comprised between 0.1 to 10% by weight expressed as Ti or V tetrahalide.

Summing up, the catalysts of this invention consist of the product of the reaction between:

(a) the product obtained by reacting a halogenated Ti or V compound with a hydrated magnesium halide having the formula:

$$MgX_2 \cdot nH_2O$$

wherein X is a halogen, and n is a number higher than 0, under conditions in which the hydrated halide is transformed, at least on the surface, to anhydrous magnesium halide; and (b) a hydride or organometallic compound of metals belonging to Group I, II or III or the Mendelyeev Periodic System.

Preferably the organometallic compound or hydride (b) is selected from the following group of compounds: $Al(C_2H_5)_3$, $Al(C_2H_5)_2Cl$, $Al(iC_4H_9)_3$, $Al(iC_4H_9)_2Cl$, $Al(C_2H_5)_3Cl_3$, $Al(C_2H_5)_2H$, $Al(iC_4H_9)_2H$, $Al(C_2H_5)_2Br$, $LiAl(iC_4H_9)_4$, $Li(iC_4H_9)$, $Mg(C_2H_5)_2$.

The molar ratio between the Al compound and the Ti or V compound is not critical.

For polymerizing ethylene the molar ratio Al/Ti is preferably comprised between 50 and 1000.

The catalysts according to the present invention are particularly useful in polymerizing ethylene or mixtures thereof with higher alpha-olefins such as propylene, butene-1, etc., and/or diolefins, particularly with regard to the yield of polymer obtained. They can also be used for polymerizing higher alpha-olefins such as propylene, butene-1, etc. to homopolymers. The polymerization is carried out in liquid phase in the presence or absence of inert solvents, or in the gaseous phase.

The polymerization temperature may be comprised between $-80°$ and $200°$ C., preferably between $50°$ and $100°$ C., at atmospheric or increased pressure.

The molecular weight of the polymer may be regulated according to the known methods, such as, for example, by carrying out the polymerization in the presence of an alkyl halide, organometallic compounds of Cd or Zn, or hydrogen. The catalytic activity of the catalysts of this invention is little influenced by the presence of the molecular weight regulators.

For instance, when polymerizing ethylene, it is possible to regulate the molecular weight of the polyethylene produced in a range of practical useful intrinsic viscosities, determined in Tetralin at $135°$ C., comprised between about 1.5 and 3.0 dl./g., without a decrease in the polymer yield to a value below which it would be necessary to purify the polymer of catalyst residues.

The polyethylene obtained is a substantially linear and highly crystalline polymer, having density values equal to or higher than 0.96 g./cm.$^3$ and having characteristics of workability, especially as far as injection molding is concerned, which are very good and generally better than those of polyethylene obtained with the conventional so-called "Ziegler catalysts." The Ti content of polyethylene prepared with the catalysts according to the present invention is generally lower than 20 p.p.m. by weight.

The following examples are given to illustrate the invention, and are not intended to be limiting.

Unless otherwise specifically indicated, the percentages reported in the examples are by weight. The intrinsic viscosity ($\eta$) of the polymers was measured in Tetralin at $135°$ C.

EXAMPLE 1

Into a glass autoclave provided with a stirrer and fitted with a filtering plate placed on its bottom there were introduced 300 cm.$^3$ of TiCl$_4$. Thereupon the temperature was brought to $135°$ C. 70 g. of MgCl$_2 \cdot$6H$_2$O free from magnesium oxychloride were then added. After one hour of reaction, the excess of TiCl$_4$ was removed by hot filtration. The solid product left behind in the autoclave was repeatedly washed with boiling TiCl$_4$ and then with cyclohexane at $80°$ C. until the disappearance of TiCl$_4$ in the washing liquid. The product was then discharged from the autoclave and dried at $100°$ under vacuum.

The analysis of the dried product gave: Ti=3.28%, Cl=52.7%.

The X-ray analysis showed that no Mg oxychloride was present and revealed the presence of anhydrous MgCl$_2$.

Fifty milligrams of the product thus obtained were suspended in 50 cc. of n-heptane and used to polymerize ethylene under the following conditions: into a stainless steel autoclave having a holding capacity of 1.8 liters and purified with dry nitrogen, there were introduced 1000 cc. of technical n-heptane and then 2 g. of

Thereupon, the temperature was brought up to $75°$ C. and 0.050 g. of the catalytic component suspended in 50 cc. of n-heptane were added.

Immediately thereafter, 3 atm. of hydrogen and 10 atm. of ethylene were introduced. The temperature rose to about $85°$ C. and was maintained at $80°$ C.$\pm 5°$ during the polymerization. The total pressure was kept constant by continuously feeding ethylene. After two hours the suspension was discharged from the autoclave. The polymer was separated by filtration, and dried at $100°$ C. under vacuum.

There were thus obtained 355 g. of polyethylene having an intrinsic viscosity, in Tetralin at $135°$ C., of 2.5 dl./g. The yield in polymer was 222,000 g./g. Ti.

EXAMPLE 2

The preparation of the catalytic component described in Example 1 was repeated with the difference that the reaction took place at $100°$ instead of at $135°$ C. The analysis of the product thus obtained gave: Ti=3.04%, Cl=52.5%. The X-ray analysis showed the presence of MgCl$_2$ and that no Mg(OH)Cl was formed.

0.059 g. of the solid product was used to polymerize ethylene under the conditions of Example 1.

There were thus obtained 334 g. of polymer having an intrinsic viscosity of 2.7 dl./g. The yield in polymer was 209,000 g./g. Ti.

EXAMPLE 3

75 g. of MgCl$_2 \cdot$6H$_2$O were dried for 8 hours at $110°$ C. in a nitrogen stream in such a way as to remove all the absorbed water and part of the water of crystallization.

The X-ray examination of the product thus obtained showed the presence of significant amounts of

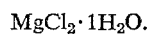

70 g. of the product thus obtained were reacted with TiCl$_4$ under the same conditions as in Example 1. The analysis of the washed and dried product gave a Ti content of 10.0% and a Cl content of 54.6%. On X-ray analysis Mg(OH)Cl was not found to be present.

0.015 g. of said product was used to polymerize ethylene under the same conditions as those of the preceding examples. After 4 hours there were obtained 196 g. of polymer having an intrinsic viscosity in Tetralin at $135°$ C., of 2.4 dl./g. The yield in polymer was 131,000 g./g. Ti.

EXAMPLE 4

The catalytic component prepared according to Example 1 was used in the polymerization of propylene carried out under the following conditions: 1800 cc. of technical n-heptane, 4.7 g. of Al(C$_2$H$_5$)$_2$Cl and 0.087 g. of the catalytic component comprising the carrier and prepared according to Example 1 were introduced into an autoclave having a holding capacity of 5 liters and purified with dry nitrogen. Immediately thereafter, 2.5 atm. of propylene and 0.3 atm. of hydrogen were introduced. The temperature was maintained at $70°$ C. The total pressure was kept constant during the polymerization by continuously feeding propylene.

After 4 hours the reaction mixture was discharged from the autoclave. The polymer was separated by filtration and dried under vacuum at $100°$ C. 200 g. of partially crystalline polypropylene were obtained. The yield in polymer amounted to 71,000 g./g. Ti.

EXAMPLE 5

7 g. MgCl$_2 \cdot$6H$_2$O were reacted with 350 cc. of TiCl$_4$ under the same conditions as in Example 1. The analysis of the washed and dried product showed the presence of 4.55% of Ti and 64.95% of Cl. The X-ray analysis showed that the product is substantially formed of anhydrous MgCl$_2$.

0.034 g. of said product was used to polymerize ethylene under the conditions of Example 1. After 6 hours there were obtained 384 g. of polymer having an intrinsic viscosity of 2.3 dl./g. The yield in polymer was 248,000 g./g. Ti.

EXAMPLE 6

23 g. of $MgCl_2 \cdot 2H_2O$ were reacted with 400 cc. of $TiCl_4$ under the same conditions as in Example 1. The analysis of the washed and dried product showed the presence of 3.75% of Ti and 68.5% of Cl. The X-ray analysis showed that the product is substantially formed of anhydrous $MgCl_2$.

0.0425 g. of this product were used to polymerize ethylene under the conditions of Example 1. After 4 hours there were obtained 452 g. of polymer with a yield of 283,000 g./g. Ti.

EXAMPLE 7

Into the autoclave used in Example 1 were introduced 300 cc. of $TiCl_4$. The temperature was brought to 135° C. Thereupon, 70 g. of $MgBr_2 \cdot 6H_2O$ were introduced. After 1 hour of heating the excess $TiCl_4$ was removed by hot filtering. The solid product remaining in the autoclave was repeatedly washed with boiling $TiCl_4$ and then with boiling cyclohexane until the total disappearance of $TiCl_4$ in the washing liquid. The analysis of the solid product dried under vacuum at 100° C. showed a Ti content of 4.25% and Cl and Br contents, respectively, of 53% and 10.5%. The X-ray analysis of the product showed that it is formed prevailingly of $MgCl_2$.

0.041 g. of said product was used to polymerize ethylene under the conditions of Example 1. After 3 hours there were obtained 545 g. of polymer having an intrinsic viscosity of 2.3 dl./g. The polymer yield was 310,000 g./g. Ti.

EXAMPLE 8

70 g. of $MgCl_2 \cdot H_2O$ were reacted with 300 cc. of $TiCl_4$ under the same conditions as described in Example 1. The analysis of the washed and dried product showed the presence of 0.75% of Ti and 60.2% of Cl. The X-ray analysis showed that the product is substantially formed of anhydrous $MgCl_2$. No $Mg(OH)Cl$ was found to be present.

0.031 g. of said product was used to polymerize ethylene under the conditions of Example 1. After 4 hours there were obtained 159 g. of polymer. The yield was 757,000 g./g. Ti.

Results similar to those reported in the examples are obtained using other hydrated magnesium halides, other hydrides or organometallic compounds of the Groups I to III metals, and other titanium or vanadium compounds as disclosed.

It will be apparent that some changes in details may be made in practicing the invention without departing from the spirit thereof. Therefore, we intend to include, in the appended claims, all changes and modifications which will be obvious to those skilled in the art from the description and working examples given herein.

What we claim is:

1. A process for preparing a supported catalytic component to be used with a second catalytic component consisting of a hydride or organometallic compound of a metal belonging to Group I, II or III of the Mendelyeev Periodic System for the polymerization of olefins, comprising the step of reacting a hydrated magnesium bichloride containing from 1 to 6 moles of $H_2O$ with an excess of a normally liquid titanium or vanadium halide, said excess being preheated at a temperature higher than 70-80° C., and thereafter removing the liquid phase from the reaction zone.

2. The process according to claim 1, characterized in that the hydrated magnesium bichloride is selected from the magnesium bichloride containing from 1 to 4 moles of $H_2O$.

3. The process according to claim 1, characterized in that the liquid titanium or vanadium halide is selected from the group consisting of the tetrahalides of said metals.

4. A process for preparing a catalyst for the polymerization of olefins consisting in reacting a supported catalytic component prepared acording to the process of claim 1 with a hydride or organometallic compound of a metal belonging to Group I, II or III of the Mendelyeev Periodic System.

5. The process for the polymerization of ethylene and mixtures thereof with higher alpha-olefins and/or diolefins, characterized in that the polymerization is carried out in the presence of a catalyst prepared by the process of claim 4.

6. The process according to claim 5, characterized in that the polymerization is carried out at temperatures comprised between —80° and 200° C. in the presence of an inert liquid and of a regulator of the molecular weight of the polymer and in that the polymer thus obtained does not require any purification treatment for the removal of catalyst residues therefrom.

7. The process according to claim 5, characterized in that the polymerization is carried out in the absence of an inert diluent.

References Cited

UNITED STATES PATENTS

| | | | |
|---|---|---|---|
| 2,981,725 | 4/1961 | Luft et al. | 260—94.9 DA |
| 3,238,146 | 3/1966 | Hewitt et al. | 260—94.9 DA |
| 3,642,746 | 2/1972 | Kashiwa et al. | 260—94.9 DA |

FOREIGN PATENTS

| | | | |
|---|---|---|---|
| 1,565,722 | 3/1969 | France | 260—94.9 DA |

JAMES A. SEIDLECK, Primary Examiner

E. J. SMITH, Assistant Examiner

U.S. Cl. X.R.

252—429 C; 260—85.3 R, 88.2 R, 93.7, 94.9 DA

UNITED STATES PATENT OFFICE
CERTIFICATE OF CORRECTION

Patent No. 3,803,105    Dated April 9, 1974

Inventor(s) Paolo GALLI et al

It is certified that error appears in the above-identified patent and that said Letters Patent are hereby corrected as shown below:

Col. 1, line 5 from below,    " magnsium " should be - - - magnesium - - -.

Col. 2, line 7 from below,    " or " ( after III ) should be - - - of - - -.

Col. 3, Example 1, line 5 from below,    the formula - - -

$Al(iC_4H_9)_3$ - - - should appear after " 2 g. of ".

last line, the formula " $Al(iC_4H_9)_3$ " should be deleted.

Col. 4, line 4 of Example 4,    the abbreviation - - - g. - - - should appear after " 0.087 ".

Signed and sealed this 31st day of December 1974.

(SEAL)
Attest:

McCOY M. GIBSON JR.                C. MARSHALL DANN
Attesting Officer                  Commissioner of Patents

Notice of Adverse Decision in Interference

In Interference No. 100,152, involving Patent No. 3,803,105, P. Galli and G. Di Drusco, POLYMERIZATION CATALYSTS, final judgment adverse to the patentees was rendered Mar. 1, 1984, as to claims 1–7.

[*Official Gazette November 19, 1985.*]